United States Patent
Sizov et al.

(10) Patent No.: US 11,283,388 B1
(45) Date of Patent: Mar. 22, 2022

(54) VOLTAGE ROTATOR FOR HIGH SWITCHING FREQUENCY PWM INVERTER

(71) Applicant: Rockwell Automation Technologies, Inc., Mayfield Heights, OH (US)

(72) Inventors: Gennadi Sizov, Shorewood, WI (US); Zoran Vrankovic, Greenfield, WI (US); Todd M. Oestreich, Jackson, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/134,801

(22) Filed: Dec. 28, 2020

(51) Int. Cl.
| | |
|---|---|
| *H02P 27/08* | (2006.01) |
| *H02P 21/18* | (2016.01) |
| *H02M 7/5387* | (2007.01) |
| *H02P 21/00* | (2016.01) |
| *H02P 21/22* | (2016.01) |

(52) U.S. Cl.
CPC .......... *H02P 27/08* (2013.01); *H02M 7/5387* (2013.01); *H02P 21/0003* (2013.01); *H02P 21/18* (2016.02); *H02P 21/22* (2016.02)

(58) Field of Classification Search
CPC .......... H02P 27/00; H02P 27/04; H02P 27/06; H02P 27/08; H02P 27/085; H02P 27/12; H02P 21/00; H02P 21/22; H02P 21/0021; H02P 21/0003; H02P 21/14; H02P 21/18; H02P 21/50; H02P 23/00; H02P 23/0004; H02P 23/0027; H02P 23/07; H02P 23/14; H02P 23/16; H02P 23/18; H02P 23/28; H02P 6/00; H02P 6/04; H02P 6/06; H02P 6/08; H02P 6/12; H02P 6/15; H02P 6/17;
(Continued)

(56) References Cited

U.S. PATENT DOCUMENTS

| | | | |
|---|---|---|---|
| 6,531,842 B2 | 3/2003 | LeDoux et al. | |
| 7,276,877 B2 * | 10/2007 | Qiu | G05B 13/048 318/453 |

(Continued)

OTHER PUBLICATIONS

Wu et al.; "High-Frequency, GaN Diode-Free Motor Drive Inverter with Pure Sine Wave Output"; First published at PCIM Europe 2012; www.powertransmission.com—(4) pages.

*Primary Examiner* — Antony M Paul
(74) *Attorney, Agent, or Firm* — Boyle Fredrickson, SC

(57) ABSTRACT

A motor controller executing a current regulator and a modulation routine in separate update intervals provides an improved fundamental voltage waveform for a motor controlled by the motor controller. The current regulator is executed at a first periodic update rate and the modulation routine is executed at a second periodic update rate, where the frequency at which the modulation routine executes is at least twice the frequency at which the current regulator executes. Executing the current regulator and the modulation routines at different frequencies results in the current regulator generating a single voltage reference signal for multiple periods of the modulation routine. To reduce voltage ripple induced by decoupling execution of the current regulator and the modulation routine, the motor controller extrapolates the voltage reference generated by the current regulator into multiple voltage reference signals, where a unique voltage reference signal is provided for each period of the modulation routine.

20 Claims, 10 Drawing Sheets

(58) Field of Classification Search
CPC ...... H02P 1/00; H02P 1/04; H02P 1/24; H02P 1/46; H02P 1/426
See application file for complete search history.

(56) References Cited

U.S. PATENT DOCUMENTS 7,471,008 B2  12/2008  Stahlhut et al.
7,957,166 B2   6/2011  Schnetzka et al.

\* cited by examiner

VOLTAGE ROTATOR FOR HIGH SWITCHING FREQUENCY PWM INVERTER

BACKGROUND INFORMATION

The subject matter disclosed herein relates to a motor controller configured to operate at a high switching frequency. More specifically, a motor controller is configured to execute a current regulator to generate voltage references for a motor at a first update rate and to execute a modulation routine to output the desired voltage to the motor at a second update rate.

As is known to those skilled in the art, motor drives are utilized to control operation of a motor. According to one common configuration, a motor drive includes a DC bus having a DC voltage of suitable magnitude from which an AC voltage may be generated and provided to an AC motor. The DC voltage may be provided as an input to the motor drive or, alternately, the motor drive may include a converter section which converts an AC voltage input to the DC voltage present on the DC bus. The converter section may be passive, including conventional diode rectification, or active, including controlled power electronic switching devices, either of which may convert an AC voltage input to a DC voltage for the DC bus. The power electronic switching devices in an active rectifier may be selected from transistors, such as insulated gate bipolar transistors (IGBTs) or metal oxide semiconductor field-effect transistors (MOSFETs), thyristors, or silicon-controlled rectifiers (SCRs). The power electronic switching device may also include a reverse conduction power electronic device, such as a freewheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus.

The motor drive receives a command signal which indicates the desired operation of the motor. The command signal may be a desired torque, speed, or position at which the motor is to operate. The torque, speed, or position of the motor is controlled by varying the amplitude and frequency of the AC voltage applied to the stator of the motor. An inverter section is provided between the DC bus and the output of the motor drive to generate the controlled AC voltage. The inverter section includes power electronic switching devices, such as IGBTs, MOSFETs, thyristors, or SCRs, and a reverse conduction power electronic device connected in parallel across the power electronic switching device. The motor is connected to the output terminals of the motor drive, and the controller generates the switching signals to rapidly switch the switching devices in the inverter on and off at a predetermined switching frequency and, thereby, to alternately connect or disconnect the DC bus to the output terminals and, in turn, to the motor. The output waveform is, by nature of the switching, rectangular, either connecting or disconnecting the output of the motor drive to the DC bus, such that the output is either at the DC voltage present on the DC bus or at zero volts. By varying the duration during each switching period for which the output terminal of the motor drive is connected to the DC voltage, the magnitude of the output voltage is varied. The motor controller utilizes modulation techniques such as pulse width modulation (PWM) to vary the magnitude of the output voltage over each cycle of a desired fundamental frequency to synthesize waveforms having desired amplitudes and frequencies.

Historically, current regulation and modulation routines have been executed during a single periodic update interval. The current regulator receives current feedback signals corresponding to a current output to the motor and generates voltage reference signals corresponding to desired operation of the motor. The modulation routine receives the voltage reference signals from the current regulator and generates switching signals for the switching devices to output the appropriate voltage as a result of the voltage reference signal generated by the current regulator. Execution of both routines within a single periodic update interval is desirable as the modulation routine updates the voltage output to the motor at the same rate the current regulator generates the voltage reference signals.

A trend in motor controllers is to execute the current regulator and the modulation routine at increasing frequency. Increasing the frequency allows the motor controller to update the average voltage at a finer time interval which generates an output voltage at the fundamental operating frequency that more closely approximates a sinusoidal output voltage than executing the same modulation routine at lower switching frequencies. However, the control routines utilized to execute the current regulator and modulation routine are often computationally intensive. Increasing the frequency of the update interval for the current regulator and modulation routing places increased demands on the computational abilities of the motor controller. As a result, there are practical limitations for the maximum current regulator update frequency that may be obtained due to the computational abilities of the motor controller. Increasing the computational speed either via additional processing cores or via an increased clock frequency increase the cost and complexity of the motor controller.

Thus, it would be desirable to provide a motor controller having an increased maximum switching frequency without requiring a corresponding increase in the computational abilities for the motor controller.

Another trend in motor controllers is to provide increasing operational speeds for the motors connected to the motor controller. Historically, motor controllers supplied output voltages to a motor with a fundamental frequency varying between zero speed and the traditional line frequency of 50 or 60 Hertz. More recently, motor controllers are being configured to supply output voltages having an upper limit on the fundamental frequency in the hundreds or thousands of Hertz to achieve higher motor speeds. Increasing the fundamental frequency, however, reduces the number of periodic update intervals for the current regulator and modulation routine that execute during each cycle of the output voltage. Reducing the number of update intervals per cycle of the fundamental voltage reduces how closely the output voltage approximates a sinusoidal waveform.

Thus, it would be desirable to provide a motor controller having an increased maximum switching frequency to provide improved voltage waveforms at increased fundamental frequencies.

BRIEF DESCRIPTION

According to one embodiment of the invention, an inverter configured to operate at a high switching frequency includes a Direct Current (DC) bus, an output, multiple switching devices, and a processing unit. The DC bus is configured to have a DC voltage present on the DC bus, and the output is configured to provide an Alternating Current (AC) voltage to a motor operatively connected to the inverter. Each of the switching devices is operatively connected between the DC bus and the output and are selectively controlled to convert the DC voltage to the AC voltage. The processing unit is configured to execute a series of instructions to determine a first reference voltage at a first update rate and to determine multiple second reference voltages at a second update rate. The first reference voltage corresponds to a desired AC voltage supplied to the motor. The second update rate is a multiple of the first update rate, and each of the second reference voltages is a function of the first reference voltage and of a desired speed of rotation of the motor.

According to another embodiment of the invention, a method for operating an inverter at a high switching frequency is disclosed. A first reference voltage for an Alternating Current (AC) motor operably connected to an output of the inverter is determined during a first periodic interval. Multiple second reference voltages for the AC motor are determined at a second periodic interval. The second periodic interval is shorter than the first periodic interval, and each of the second reference voltages is determined as a function of the first reference voltage and of a desired speed of the motor.

According to still another embodiment of the invention, an inverter configured to operate at a high switching frequency includes a Direct Current (DC) bus, an output, multiple switching devices, and a processing unit. The DC bus is configured to have a DC voltage present on the DC bus, and the output is configured to provide an Alternating Current (AC) voltage to a motor operatively connected to the inverter. Each of the switching devices is operatively connected between the DC bus and the output and are selectively controlled to convert the DC voltage to the AC voltage. The processing unit is configured to execute a series of instructions to execute a current regulator at a first update rate and execute a modulation routine at a second update rate. The second update rate is at least twice the first update rate. The current regulator generates a first reference voltage, and the modulation routine generates multiple second reference voltages as a function of the first reference voltage and of a desired speed of the motor.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
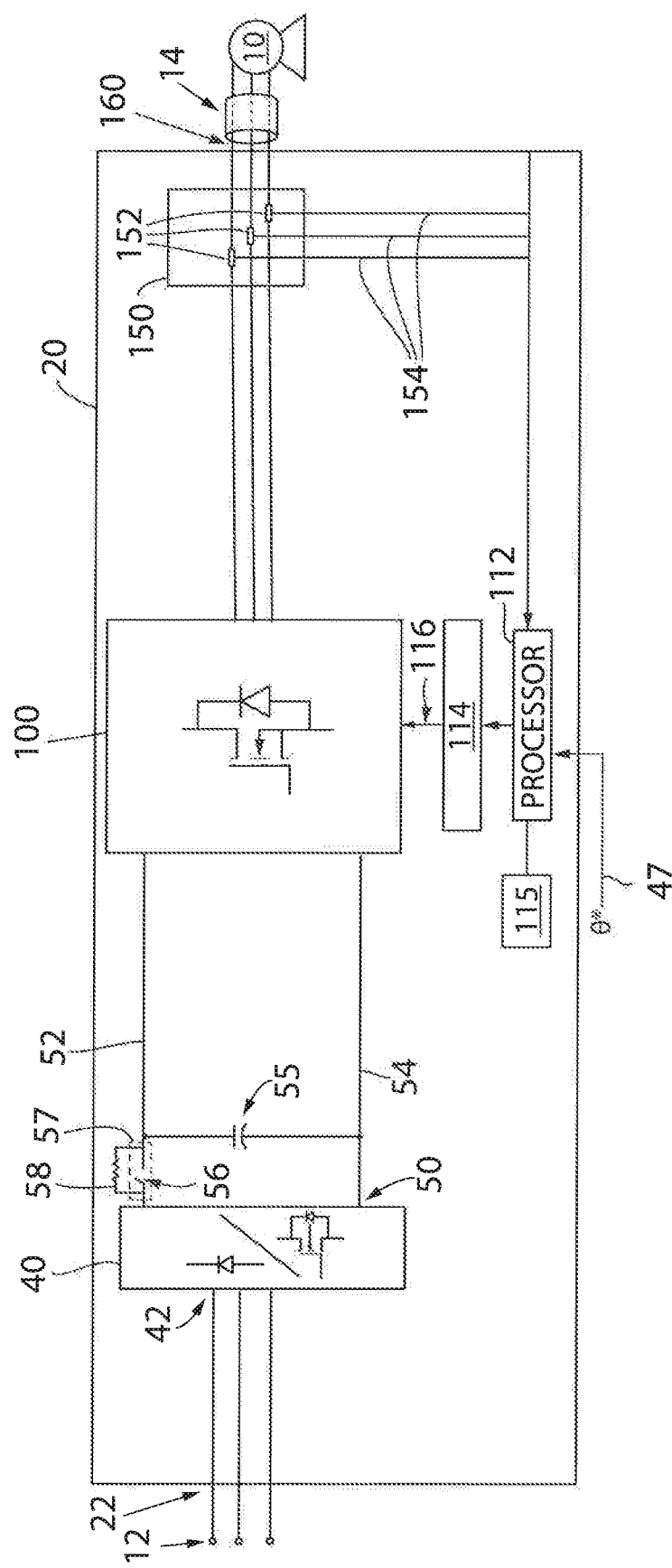
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a motor controller having an increased maximum switching frequency without requiring a corresponding increase in the computational abilities for the motor controller. The motor controller separates the current regulator and modulation routines into separate update intervals. The current regulator is executed at a first periodic update rate and the modulation routine is executed at a second periodic update rate. In this manner, the frequency at which the modulation routine is executed may be increased while maintaining the frequency at which the current regulator is executed at a lower rate. Additionally, the modulation routine may be implemented in a dedicated hardware circuit such that the computational load on the processor is not increased. It is contemplated that the frequency at which the modulation routine executes is at least twice the frequency at which the current regulator executes.

Executing the current regulator and the modulation routines at different frequencies results in the current regulator generating a single voltage reference signal for multiple periods of the modulation routine. Maintaining a constant voltage reference over multiple periods of the modulation routine introduces distortion on the fundamental frequency.

The distortion may appear as a voltage ripple superimposed on the output voltage waveform.

According to another aspect of the invention, the voltage ripple is reduced by extrapolating the voltage reference generated by the current regulator into multiple voltage reference signals, where a unique voltage reference signal is provided for each period of the modulation routine. Increasing the modulation frequency and extrapolating the voltage reference signal to provide a unique voltage reference signal for each period of the modulation routine results in a voltage waveform output from the motor drive that more closely approximates a sinusoidal waveform at increased fundamental frequencies.

Turning initially to FIG. 1, one embodiment of a motor drive 20 incorporating a high PWM switching frequency is illustrated. An AC voltage 12 is provided at an input 22 to the motor drive 20. According to the illustrated embodiment, the AC voltage 12 is a three-phase AC input voltage. The motor drive supplies an AC output voltage from an output 160 of the motor drive to a motor 10 operatively connected to the motor drive 20 via a cable 14. The output voltage is a three-phase AC output voltage with individual conductors shown extending between the motor 10 and drive 20 for each phase of the motor. It is understood that the illustrated conductors may be combined within a cable 14, run as individual conductors, or a combination thereof according to the application requirements.

Figure 2:
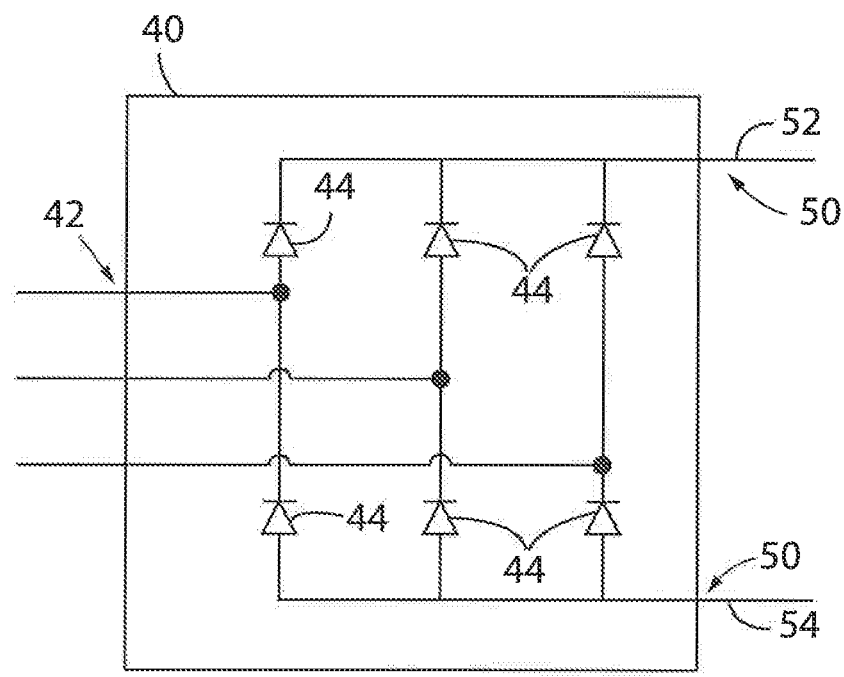
FIG. 2 is a block diagram representation of a rectifier section from the motor drive of FIG. 1.

The AC input voltage 12 is provided to a converter section 40 of the motor drive 20. One or more additional filters may be included between the input 22 of the motor drive and the converter section 40 according to the application requirements. The converter section 40 may include any electronic device suitable for passive or active rectification as is understood in the art. With reference also to FIG. 2, the illustrated converter section 40 is a passive converter and includes a set of diodes 44 forming a diode bridge. The converter section 40 receives the AC voltage 12 at an input 42, rectifies the three-phase AC voltage to a DC voltage, and provides the DC voltage to a DC bus 50 at an output of the converter section. Optionally, the converter section may be an active converter, which includes gate-controlled switching devices including, but not limited to, thyristors, silicon-controlled rectifiers (SCRs), or silicon based transistors, such as IGBTs or MOSFETs. The converter section may alternately include high frequency switching devices including, but not limited to, Silicon Carbide (SiC) or Gallium Nitride (GaN) wide band gap IGBTs or MOSFETs which may switch in the twenty kilohertz (20 kHz) to the megahertz range to convert the voltage at the input 42 from AC to a DC voltage for the DC bus 50. The DC bus 50 is connected to the output of the converter section 40, and the DC voltage output by the converter is present between the positive rail 52 and the negative rail 54 of the DC bus 50.

Referring again to FIG. 1, a DC bus capacitor 55 is connected between the positive and negative rails, 52 and 54, to reduce the magnitude of the ripple voltage resulting from converting the AC voltage to a DC voltage. It is understood that the DC bus capacitor 55 may be a single capacitor or multiple capacitors connected in parallel, in series, or a combination thereof. The magnitude of the DC voltage between the negative and positive rails, 54 and 52, is generally equal to the magnitude of the peak of the AC input voltage.

As also shown in FIG. 1, a DC bus charge circuit 57 may be connected on the DC bus 50. In the illustrated embodiment, the DC bus charge circuit 57 is connected between the output of the converter section 40 and the DC bus capacitor 55. Initially, a switch 56 is in a normally open state, establishing a conduction path from the output of the converter section 40 to the positive rail 52 via a charge resistor 58. The charge resistor 58, in combination with the DC bus capacitor 55 establishes a charging time constant, as is understood in the art, to allow the DC voltage on the DC bus 50 to charge from zero volts DC at power up to a voltage level approximately equal to the full DC bus voltage resulting from rectifying the AC input voltage. When the DC voltage level reaches a preset charged level, the switch 56 is closed, bypassing the charge resistor 58 and allowing current to flow directly from the converter section 40 onto the DC bus 50.

Figure 3:
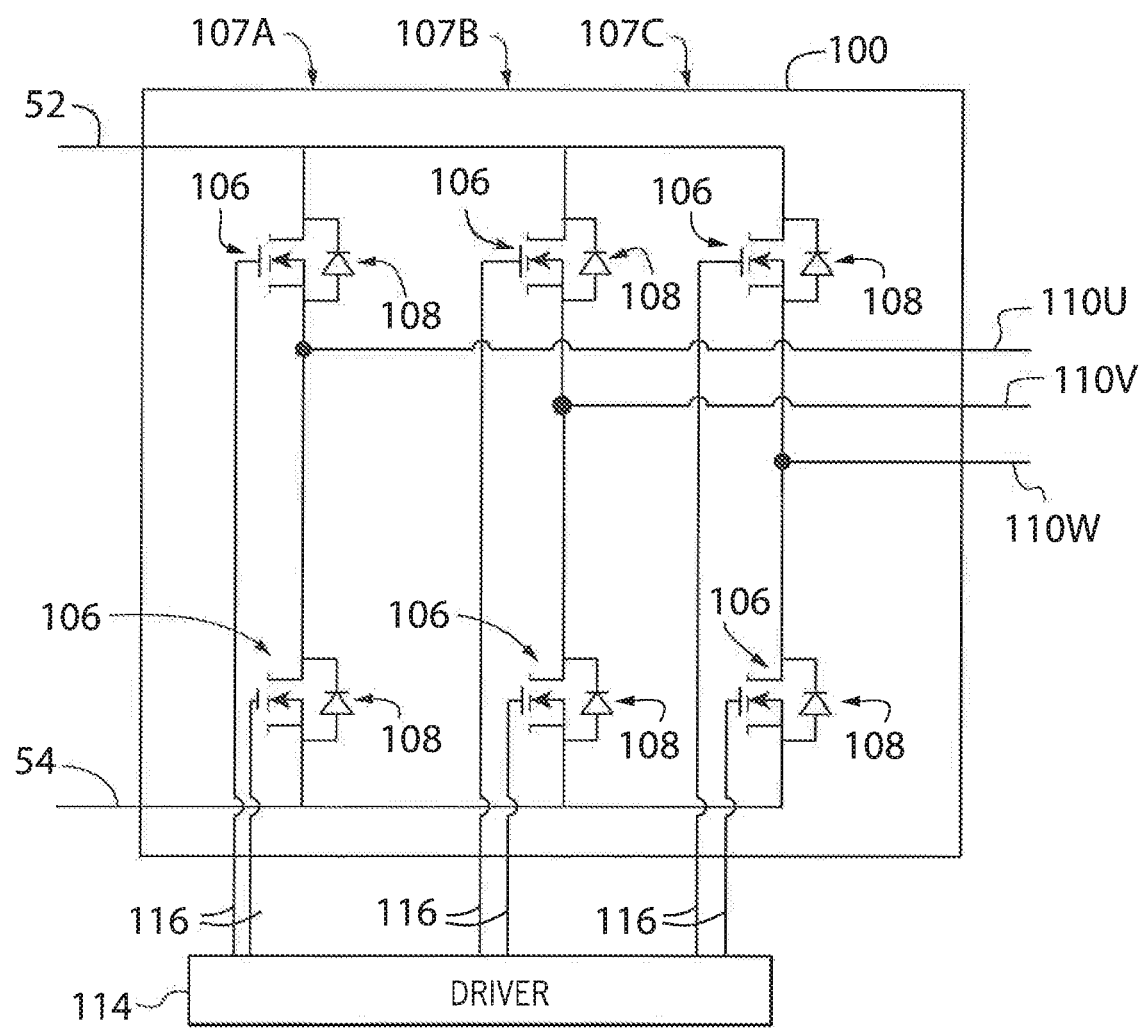
FIG. 3 is a block diagram representation of an inverter section and gate driver module from the motor drive of FIG. 1.

The DC bus 50 is connected in series between the converter section 40 and an inverter section 100. One or more additional filters may be included between the converter section 40 and the inverter section 100 according to the application requirements. The inverter section 100 consists of gate-controlled switching elements as described for the active converter 40, such as silicon and/or wide band based materials for IGBTs or MOSFETs, or Silicon Gate Controlled Thyristors (SCGT) and Gate Turn-Off thyristors (GTO) for medium voltage, high power units gap transistors as is known in the art. With reference also to FIG. 3, the illustrated inverter section 100 includes a power metal-oxide-semiconductor field-effect transistor (MOSFET) 106 and a reverse connected device 108, which may be a free-wheeling diode or a MOSFET's inherent body diode, connected in pairs between the positive rail 52 and each phase of the output voltage (110U, 110V, 110 W) as well as between the negative rail 54 and each phase of the output voltage. Each of the transistors 106 receives switching signals 116 to selectively enable the transistors 106 and to convert the DC voltage from the DC bus into a controlled three phase output voltage to the motor 10. When enabled, each transistor 106 connects the respective rail 102, 104 of the DC bus to one output phase 110, which is, in turn, connected between the inverter section 100 and the output terminal 160. One or more additional filters may be included between the output of the inverter section 100 and the output terminals 160 of the motor drive 20 according to the application requirements.

A current sense module 150 is provided at the output of the motor drive. The current sense module 150 includes a current sensor 152 on each phase of the AC output voltage. Each current sensor 152 generates a current feedback signal 154 corresponding to the current present at the output 160 of the motor drive for each phase of the AC output.

In operation, the motor drive 20 is configured to control operation of the motor 10 connected at the output 160. According to the embodiment illustrated in FIG. 1, a processor 112 and a driver circuit 114 may include and manage execution of modules used to control operation of the motor drive 20. The illustrated embodiment is not intended to be limiting and it is understood that various features of each module may be executed by another module and/or various combinations of other modules may be included in the processor 112 without deviating from the scope of the invention. The modules may be stored programs executed on one or more processors, logic circuits, or a combination thereof. The processor 112 may be implemented, for example, in a microprocessor, application specific integrated circuit (ASIC), field programmable gate array (FPGA), or other such customizable device. The motor drive 20 also includes a memory device 115 in communication with the processor 112. The memory device 115 may include transitory memory, non-transitory memory or a combination thereof. The memory device 115 may be configured to store data and programs, which include a series of instructions executable by the processor 112. It is contemplated that the memory device 115 may be a single device, multiple devices, or incorporated, for example, as a portion of another device such as an application specific integrated circuit (ASIC). The processor 112 is in communication with the memory 115 to read the instructions and data as required to control operation of the motor drive 20.

According to one embodiment of the invention, the processor 112 receives a reference signal identifying desired operation of the motor 10 connected to the motor drive 20. The reference signal may be, for example, a torque reference (T*), a speed reference ($\omega$*), or a position reference ($\theta$*). The processor 112 also receives feedback signals indicating the current operation of the motor drive 20. The motor drive 20 may include a voltage sensor and/or a current sensor operatively connected to the DC bus 50 and generating a feedback signal corresponding to the magnitude of voltage and/or current present on the DC bus. The motor drive 20 may also include one or more current sensors 152 and one or more voltage sensors on each phase of the AC output voltage generating feedback signals 154 corresponding to the magnitude of output current and/or voltage present at the output 160 of the motor drive 20.

Figure 4:
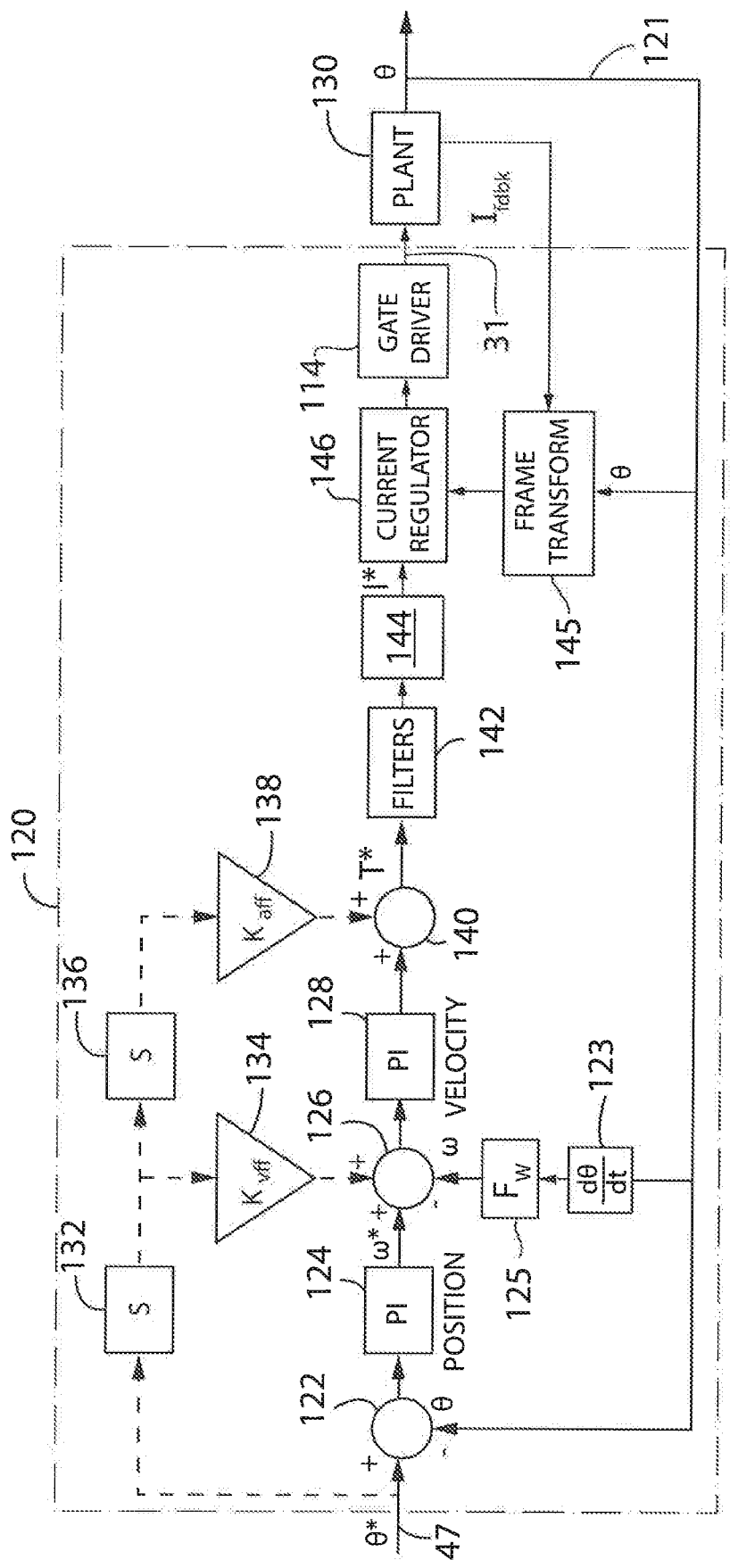
FIG. 4 is a block diagram representation of one embodiment of a controller from the motor drive of FIG. 1.

The processor 112 utilizes the feedback signals and the reference signal to control operation of the inverter section 100 to generate an output voltage having a desired magnitude and frequency for the motor 10. With reference also to FIG. 4, an exemplary controller 120 for the motor drive 20 is illustrated. The controller 120 may implemented as a series of instructions stored in the memory 115 of the motor drive 20 and executed on the processor 112. The controller 120 receives a position reference signal ($\theta$*) 47 as an input to a series of cascaded control loops. The controller 120 includes a position control loop, a velocity control loop and a current control loop. The control loops are shown as cascading control loops where an output of one control loop is provided as an input to another control loop. It is contemplated that various other control topologies may be utilized within the motor drive 20.

In the position control loop, the position reference signal ($\theta$*) 47 is compared to a position feedback signal ($\theta$) 121 at a first summing junction 122. A position error signal is output from the first summing junction 122 and input to a position loop controller 124. According to the illustrated embodiment, the position loop controller 124 is a proportional-integral (PI) controller. Optionally, the position loop controller 124 may be just a proportional (P) controller or further include a derivative (D) component. Each of the proportional (P), integral (I), and/or derivative (D) components of the position loop controller 124 includes a controller gain. The position loop controller gains are commonly referred to as a position loop proportional gain (Kpp), position loop integral gain (Kpi), and a position loop derivative gain (Kpd). The output of the position loop controller 124 is a velocity reference signal ($\omega$*).

In the velocity control loop, the velocity reference signal ($\omega$*) is compared to a velocity feedback signal ($\omega$) at a second summing junction 126. The velocity feedback signal (o) is generated by taking a derivative, as shown in the derivative block 123, of the position feedback signal ($\theta$). The velocity feedback signal (w) may also be filtered by a velocity filter block 125. A velocity error signal is output from the second summing junction 126 and input to a velocity loop controller 128. According to the illustrated embodiment, the velocity loop controller 128 is a proportional-integral (PI) controller. Optionally, the velocity loop controller 128 may be just a proportional (P) controller or further include a derivative (D) component. Each of the proportional (P), integral (I), and/or derivative (D) components of the velocity loop controller 128 includes a controller gain. The velocity loop controller gains are commonly referred to as a velocity loop proportional gain (Kvp), velocity loop integral gain (Kvi), and a velocity loop derivative gain (Kvd). The output of the velocity loop controller 128 is an acceleration reference signal.

The controller 120 may also include feed forward branches. According to the illustrated embodiment, the controller 120 includes feed forward branches for both the velocity and the acceleration elements. The position reference signal ($\theta$*) 47 is passed through a first derivative element 132 to obtain a velocity feed forward signal. The velocity feed forward signal is multiplied by a velocity feed forward gain (Kvff) 134 and combined with the velocity reference signal ($\omega$*) and the velocity feedback signal ($\omega$) at the second summing junction 126. The velocity feed forward signal is passed through a second derivative element 136 to obtain an acceleration feed forward signal. The acceleration feed forward signal is multiplied by an acceleration feed forward gain (Kaff) 138 and combined with the acceleration reference signal at a third summing junction 140 to generate a torque reference signal (T*).

The torque reference signal (T*) output from the third summing junction 140 is further processed prior to generating gate signals 116 for the inverter section 100. The torque reference signal (T*) is provided as an input to a filter section 142, which may include one or more filters to remove unwanted components from the control system, such as a low pass filter to attenuate undesirable high frequency components or a notch filter to attenuate specific frequency components having an undesirable effect on the controlled mechanical load. The output of the filter section 142 is passed through a torque gain block 144. The torque gain block 144 may include a torque constant (Kt) which defines a relationship between the current provided to the motor 10 and the torque output by the motor. The torque gain block 144 may include one or more additional gain elements, such as inertia-related gains, combined with the torque constant (Kt) to produce a desired current reference (I*) to a current regulator 146. The current regulator 146 receives a current feedback signal (Ifdbk) from the current sensors 152 at the output of the motor drive 20 and utilizes a current controller, which may include proportional, integral, and/or derivative components to regulate the current in the motor 10.

The current feedback signal (Ifdbk) is received at the controller 120 as signals corresponding to individual phases of the motor. The current feedback signal (Ifdbk), as illustrated, includes multiple feedback signals, where each signal corresponds to an amplitude of current as measured on one phase of the multi-phase motor 10. For a three-phase motor, it is contemplated that the amplitude of current is measured in all three phases of the motor. Optionally, the amplitude of current is measured in two phases of the motor and the amplitude of the third phase is determined as a function of the amplitude of the two measured phases. The measured feedback signals are then provided to a reference frame transformer 145 within the controller 120 for use by the current regulator 146.

The reference frame transformer 145 is configured to transform the current feedback signals from the stationary, physical reference frame in which the signals are measured to a rotating reference frame. The reference frame transformer 145 receives the measured phase currents in a stationary reference frame (Ifdbk) and a position feedback signal (θ) as inputs. The position feedback signal (θ) corresponds to an angular position of the motor 10. The position feedback signal (θ) may be a mechanical angular position of the motor or an electrical angular position corresponding to the electrical angle of the current provided to the motor 10. The transform between reference frames, however, utilizes electrical angular position of the current to convert the current feedback signal from the stationary reference frame to a rotating reference frame. Therefore, if the position feedback signal (θ) is the mechanical angular position of the motor, the reference frame transformer 145 first converts the mechanical angular position of the motor to the electrical angle of the current as a function of the number of poles in the motor. In the stationary reference frame, the current applied to the motor 10 varies sinusoidally at a commanded frequency output by the motor controller 20. If the current feedback signals are converted to a reference frame that rotates at an identical frequency to the commanded frequency, the rotating reference frame is synchronous to the output current and the current feedback signal becomes a "DC", or constant, value.

The reference frame transformer 145 is used to convert the measured current feedback signals to a synchronous reference frame rotating at the fundamental frequency of the current output to the motor 10. As shown below in Eqs. 1 and 2, the frame transformation utilizes the electrical angle of the motor and the amplitude of the currents measured in the motor to generate a synchronous current feedback signal rotating at the fundamental frequency of the motor. Equation 1 defines the current in the "d" axis, and equation 2 defines the current in the "q" axis.

Both currents are present when the feedback current is referred to in the d-q axes. The synchronous current feedback signal output from the reference frame transformer 145 is in the synchronous reference frame, also referred to as a d-q reference frame, includes both the d axis and the q axis components of current. The synchronous current feedback signal is provided as an input to the current regulator 146 in order to generate a voltage reference signal, where the voltage reference signal, when applied to the motor 10, generates the desired current reference, I*, input to the current regulator 146.

$$i_{d\_fund} = \frac{2}{3}[i_a \cos\theta + i_b \cos(\theta - 120°) + i_c \cos(\theta - 240°)] \quad (1)$$

$$i_{q\_fund} = \frac{2}{3}[i_a \sin\theta + i_b \sin(\theta - 120°) + i_c \sin(\theta - 240°)] \quad (2)$$

where:
θ=electrical angle;
$i_s$ =amplitude of current in phase "a" of the motor;
$i_b$=amplitude of current in phase "b" of the motor; and
$i_b$=amplitude of current in phase "c" of the motor.

The output of the current regulator 146 is provided to the gate driver 114 which, in turn, generates the switching signals 116 to the inverter section 100. The output of the gate driver 114 is illustrated as being supplied to the plant 130 of the controlled system. In a motion control system, the plant 130 typically includes the inverter section 100 of the motor drive 20, the motor 10, a mechanical load, a position feedback device, and mechanical couplings between the motor and mechanical load or between the motor and a position feedback device. The position feedback device generates the position feedback signal (θ) used by the controller 120.

The gate driver module 114 converts the voltage reference output from the current regulator to a desired output voltage having a variable amplitude and frequency, where the amplitude and frequency are selected to produce the desired operation of the motor 10. The gate driver module 114 then generates the gating signals 116 used by pulse width modulation (PWM) or by other modulation techniques to control the switching elements in the inverter section 100 to produce the desired output voltage. The gating signals 116 subsequently enable/disable the transistors 106 to provide the desired output voltage to the motor 10, which, in turn, results in the desired operation of the mechanical load coupled to the motor 10.

As previously discussed, the current regulator and the modulation routines are executed at periodic intervals. Historically, both the current regulator and the modulation routine have been executed at the same periodic interval. Increasing the frequency, or decreasing the duration of the periodic interval, at which the current regulator and the modulation routine execute allows the motor drive 20 to generate output voltage waveforms having a fundamental component that more closely approximates a sinusoidal waveform. Recent advancements in the power switching devices for the inverter 100 allow the devices to be operated at a higher modulation frequency. However, simply increasing the frequency at which the current regulator and modulation routine execute increases the computational burden on the processor 112. The present invention decouples execution of the current regulator and the modulation routine, allowing each to be executed at its own periodic interval, allowing for increased switching frequencies without as significant of an increase in computational burden on the processor 112.

Figure 5:
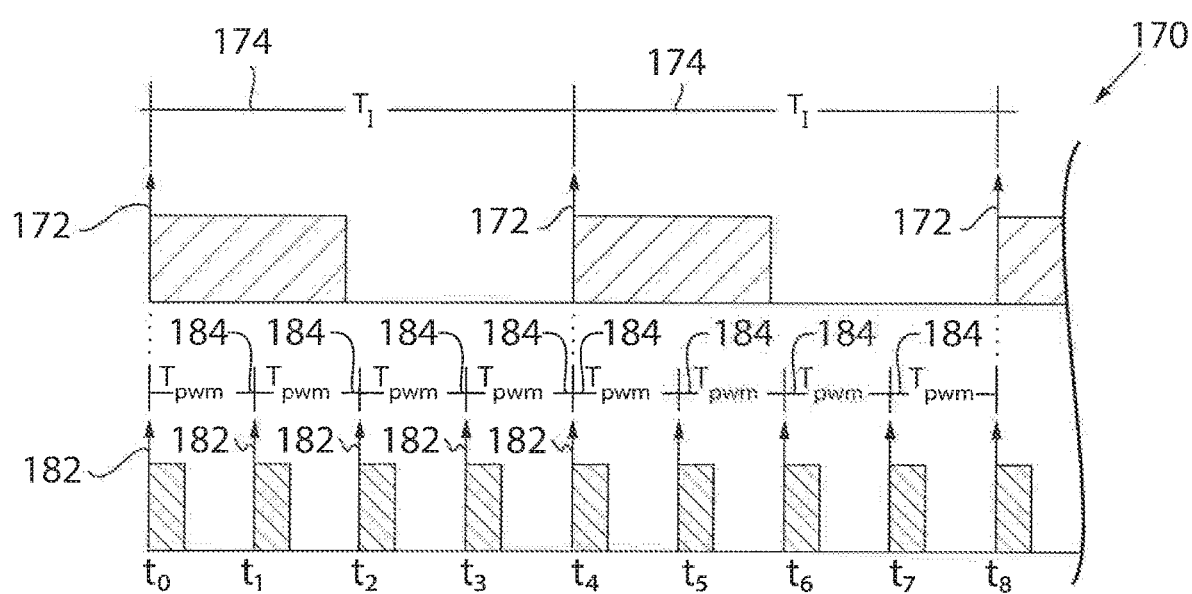
FIG. 5 is a graphical representation of periodic execution intervals for the current regulator and for the modulation routines according to one embodiment of the invention.

Turning next to FIG. 5, an exemplary timing diagram 170 of periodic intervals for execution of the current regulator 146 and the modulation routine is illustrated. A first interrupt 172 executes at a first periodic interval 174, $T_1$, and a second interrupt 182 executes at a second periodic interval 184, $T_{PWM}$. According to the illustrated embodiment, the second interrupt 182 occurs at a frequency four times greater than the first interrupt 172. The illustrated embodiment is intended to be exemplary and not limiting. It is contemplated that the second interrupt 182 may occur fewer than or more than four times per each instance of the first interrupt 172. It is further contemplated that the motor drive 20 includes parameters storing desired frequencies for both the first frequency and the second frequency, where the parameters are stored in memory 115 and configurable according to the application requirements. According to one embodiment of the invention, the first periodic frequency may be set at frequency between one and twenty kilohertz (1-20 kHz) and the second periodic frequency may be set greater than fifty kilohertz (>50 kHz). According to another embodiment of the invention, the first frequency may be set up to thirty-two kilohertz (1-32 kHz) and the second frequency may be in a range of fifty to two hundred kilohertz (50-200 kHz).

As further illustrated by FIG. 5, the current regulator 146 and the modulator routine each execute for a portion of their respective periodic interval, illustrated by the hashed region within each interval. The practical limitation, therefore, on the upper frequencies at which each periodic interval may be executed is the duration of time required to execute the current regulator or to executed the modulation routine. If a dedicated processing core is allocated to each module, the current regulator or modulation routine may utilize up to the entire duration of the periodic interval in which it executes. According to one aspect of the invention, the gate driver 114 may be a dedicated processor, processing core, or other dedicated processing circuit configured to relieve the processor 112 of the computational burden associated with the modulation routine. Although the current regulator 146 may be implemented as a dedicated processor or processing core, the current regulator is commonly executed by a processor configured to execute other tasks as well. Thus, the frequency at which the current regulator 146 is executed will be set less than the frequency at which the modulation routine is executed.

Figure 10:
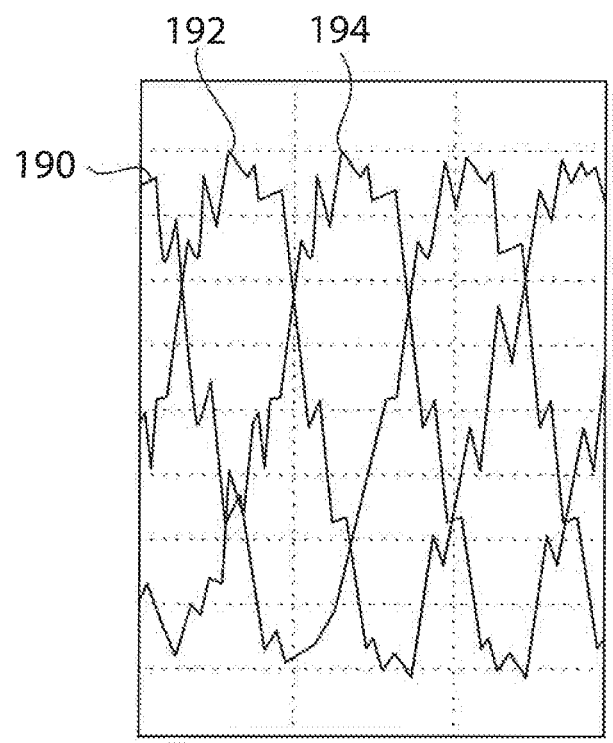
FIG. 10 is a graphical representation of voltage output from the motor drive as a result of decoupling execution of the current regulator and the modulation routines without extrapolating voltage references.
Figure 11:
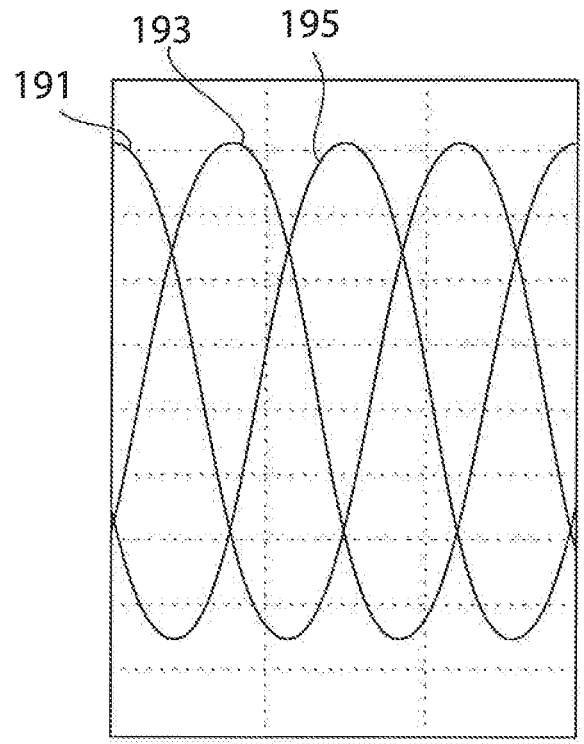
FIG. 11 is a graphical representation of voltage output from the motor drive with decoupled execution of the current regulator and the modulation routines and with extrapolated voltage references.

Executing the modulation routine at a periodic interval greater than the periodic interval for the current regulator introduces some undesirable effects on the output voltage. With reference to FIG. 10, a three-phase output voltage generated by the motor drive 20 when the current regulator and modulation routine are decoupled is illustrated. Each phase 190, 192, 194 of the output voltage has a ripple voltage superimposed upon the fundamental frequency. The ripple voltage is a result of holding the voltage reference generated from the current regulator the same for multiple cycles of the modulation routine executing. With reference next to FIG. 11, the present inventors have determined that extrapolating the voltage reference to provide a unique voltage reference to each period of the modulation routine eliminates the voltage ripple. Each phase 191, 193, 195 in FIG. 11 corresponds to the same phase 190, 192, 194 in FIG. 10 except during operation of the motor drive 20 in FIG. 11, a unique voltage reference is provided to each cycle of the modulation routine. The process for extrapolating the voltage reference is discussed below.

As discussed above, the current regulator 146 is typically configured to regulate currents in a d-q reference frame. The frame transformations, as shown in Equations 1 and 2, utilize the measured electrical angle, θ, from the position feedback device to convert the measured three-phase currents into the d-q reference frame. The voltage reference signals generated by the current regulator are, initially, in the d-q reference frame. These voltage reference signals are in a synchronous reference frame and correspond to a desired flux (d-axis) and torque (q-axis) produced in the motor. However, in order to supply voltage to the motor 10, the voltage must be voltage output in a stationary reference frame.

The stationary reference frame may be represented either as a three-phase voltage reference, where each phase of the voltage reference corresponds to one phase of the motor 10, or a two-phase voltage reference. The two-phase stationary reference frame is also referred to as an α-β reference frame. Unlike the synchronous reference frame, where the reference frame rotates at the desired angular velocity of the motor and the voltage references in the d-axis and q-axis become constant, or DC values, the reference frame for the stationary reference frame is stationary and the voltage reference in the α and β axes may be represented as a vector rotating about the origin of the α and β axes. The angle of the vector corresponds to the desired electrical angle of the motor 10 and the vector rotates around the α and β axes at the desired angular velocity of the motor 10. Conversion between the synchronous, d-q reference frame and the stationary, α-β reference frame may be performed with knowledge of the electrical angle, θ.

It is contemplated that the present invention may be implemented in a number of different reference frames. Further, conversion between reference frames is a function of the desired angular velocity for the motor 10 and of the present electrical angle of the motor. FIGS. 6-9 illustrate four exemplary embodiments of the present invention. Each exemplary embodiment will be discussed in more detail below. However, it is understood that these embodiments are illustrative of the inventive concept and not limiting as to the implementation.

Figure 6:
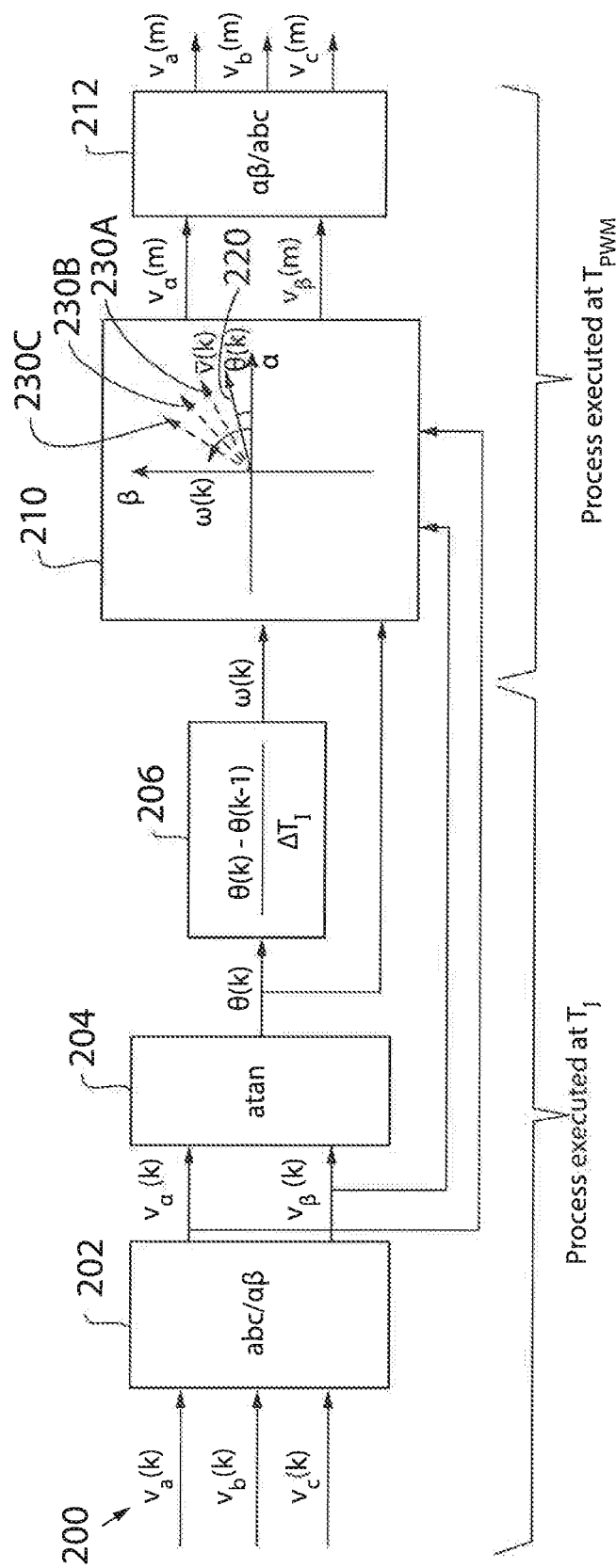
FIG. 6 is a block diagram representation of voltage reference extrapolation according to one embodiment of the invention.

Turning first to FIG. 6, either the current regulator 146 may include a transformation block or a separate frame transformation block may exist after the current regulator 146 which provides a first set of voltage reference signals 200 in the three-phase stationary reference frame. The three-phase voltage reference signals 200 may be converted to the two-phase stationary reference frame using Clark's transform which may be implemented in block 202. Clark's transform converts the three-phase voltages in the a-b-c reference frame to two-phase voltages in the α-β reference frame. As shown next in FIG. 6, the desired electrical angle, θ, and desired angular velocity, ω, of the motor 10 may be determined using an arctangent block 204 and a derivative block 206. The derivative block 206 is implemented by storing the desired electrical angle from the prior periodic interval, θ(k−1), and finding the difference in the electrical angle between successive periods to determine the angular velocity based on the duration of the periodic interval in which the derivative block 206 is executed. According to the embodiment illustrated in FIG. 6, the three-phase to two-phase transform 202, arctangent block 204, and derivative block 206 are each executed in the first periodic interval, $T_1$, with the current regulator. The first voltage reference in the two-phase stationary reference frame ($v_\alpha$ and $v_\beta$), the desired electrical angle, θ, and the desired angular velocity, ω, are each provided to the modulation routine and held constant until the next of the first periodic intervals, $T_1$, executes.

The modulation routine, therefore, receives the first reference voltage, desired electrical angle, and desired angular velocity for the motor 10 as inputs. The modulation routine assumes that a constant angular velocity is desired over the duration of the first periodic interval, $T_1$. For each of the second periodic intervals, $T_{PWM}$, that are executed during one of the first periodic intervals, $T_1$, the modulation routine extrapolates a second set of reference voltages. A voltage extrapolation block 210 uses the first voltage reference 220, which may be represented as a vector in the β-β reference frame, and determines a series of second voltage references 230. According to the illustrated embodiment, the second periodic interval, $T_{PWM}$, executes at four times the frequency of the first periodic interval, $T_1$.

The modulation routine utilizes the first voltage reference 220 and determines, as a function of the desired angular velocity, ω, of the motor 10, the expected electrical angle of the motor at each of the additional second periodic intervals during which the current regulator output is held constant. With reference also to FIG. 5, the current regulator executes during the first periodic interval 174 starting at time to. During the portion of the interval indicated by the hashed region, all of the instructions configured to execute during this interval, including the current regulator 146, are performed. The current regulator generates a first voltage reference value 220 that is then utilized during the subsequent first periodic interval 174 starting at time $t_4$. At time $t_4$, the instructions configured to execute during the first periodic interval 174, including the current regulator 146, are again executed and a new first voltage reference 220 is generated by the current regulator for use during the next first periodic interval 174. This process is continually repeated at each of the first periodic intervals 174.

The modulation routine then executes during each of the second periodic intervals 184. At the instance of the second periodic interval 184 starting at time U, the modulation routine determines expected electrical angles for the motor 10 at each of the second periodic intervals 184 from times $t_4$-$t_7$. The change in electrical angle during one of the second periodic intervals may be determined by multiplying the expected angular velocity, ω, by the duration of the second periodic interval, $T_{PWM}$. The electrical angle, θ, received as an input to the modulation routine is used as the electrical angle for the second periodic interval starting at time $t_4$. The electrical angle for each subsequent second periodic interval is then incremented by this expected change per periodic interval. The first voltage reference value 220, illustrated as a vector in block 210, may be used as the first value in the set of second voltage reference values. The vector is then rotated by an electrical angle equal to the expected change in electrical angle for each of the second periodic intervals 184 to generate three additional values in the second set of voltage reference values 230A, 230B, 230C. At the second periodic interval starting at time $t_5$, the modulation routine uses the second vector 230A from the set of second voltage references. At the second periodic interval starting at time $t_6$, the modulation routine uses the third vector 230B from the set of second voltage references. At the second periodic interval starting at time $t_7$, the modulation routine uses the fourth vector 230C from the set of second voltage references. The voltage vector in the α-β reference frame is then converted back to a three-phase reference voltage using Clark's transform at block 212. The desired output voltage for each phase of the three-phase motor is used to generate the switching signals 116 for each switching device in the inverter section 100 of the motor drive 20.

Figure 7:
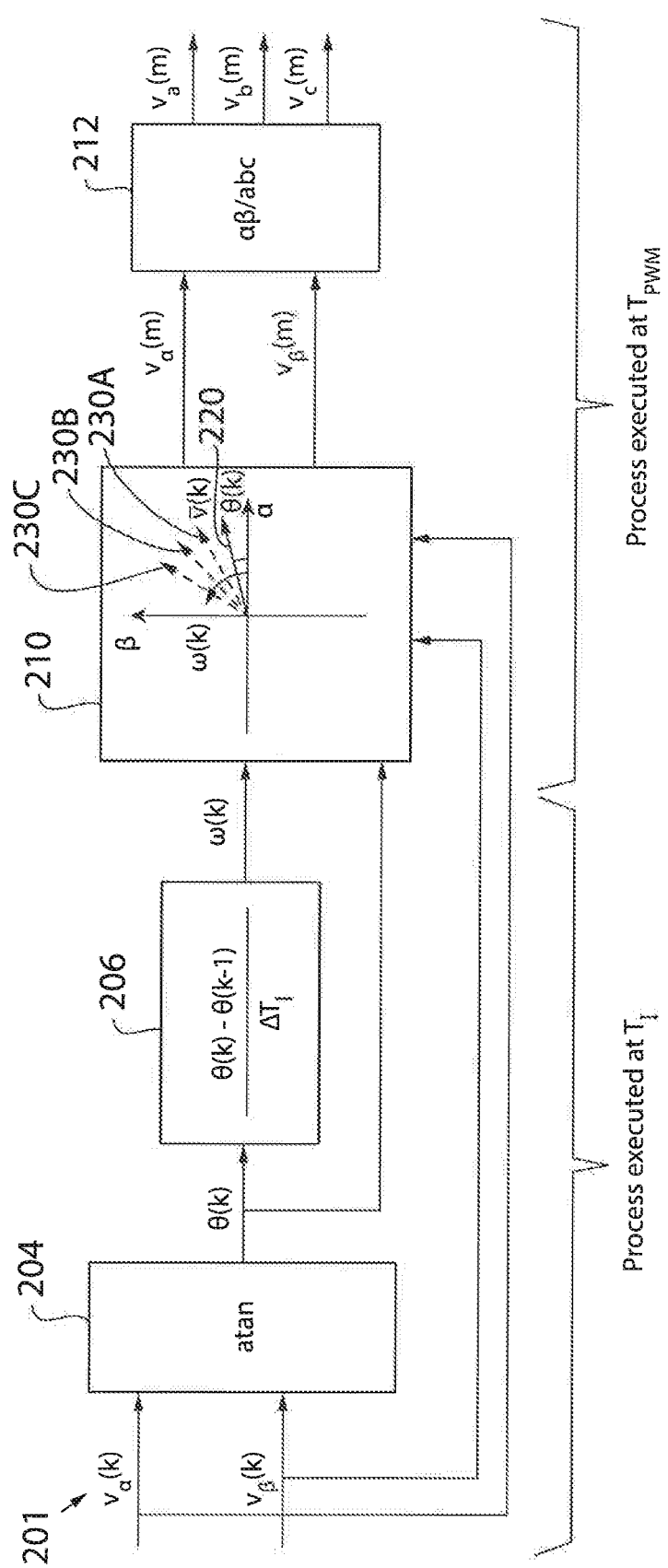
FIG. 7 is a block diagram representation of voltage reference extrapolation according to another embodiment of the invention.

Turning next to FIG. 7, either the current regulator 146 may include a transform block or a separate frame transformation block may exist after the current regulator 146 which provides a first set of voltage reference signals 201 in the two-phase stationary reference frame. Because the first set of voltage reference signals 201 are already in the α-β reference frame, the initial step of the Clark's transform 202 shown in FIG. 6 may be skipped. The arctangent block 204, and derivative block 206 are each executed in the first periodic interval, $T_1$, in the same manner as discussed with respect to FIG. 6. The first voltage reference in the two-phase stationary reference frame ($v_α$ and $v_β$), the desired electrical angle, θ, and the desired angular velocity, ω, are each provided to the modulation routine and held constant until the next of the first periodic intervals, $T_1$, executes. The modulation routine executes at each of the second periodic intervals, $T_{PWM}$, to extrapolate the second set of voltage reference signals in the same manner discussed above with respect to FIG. 6.

Figure 8:
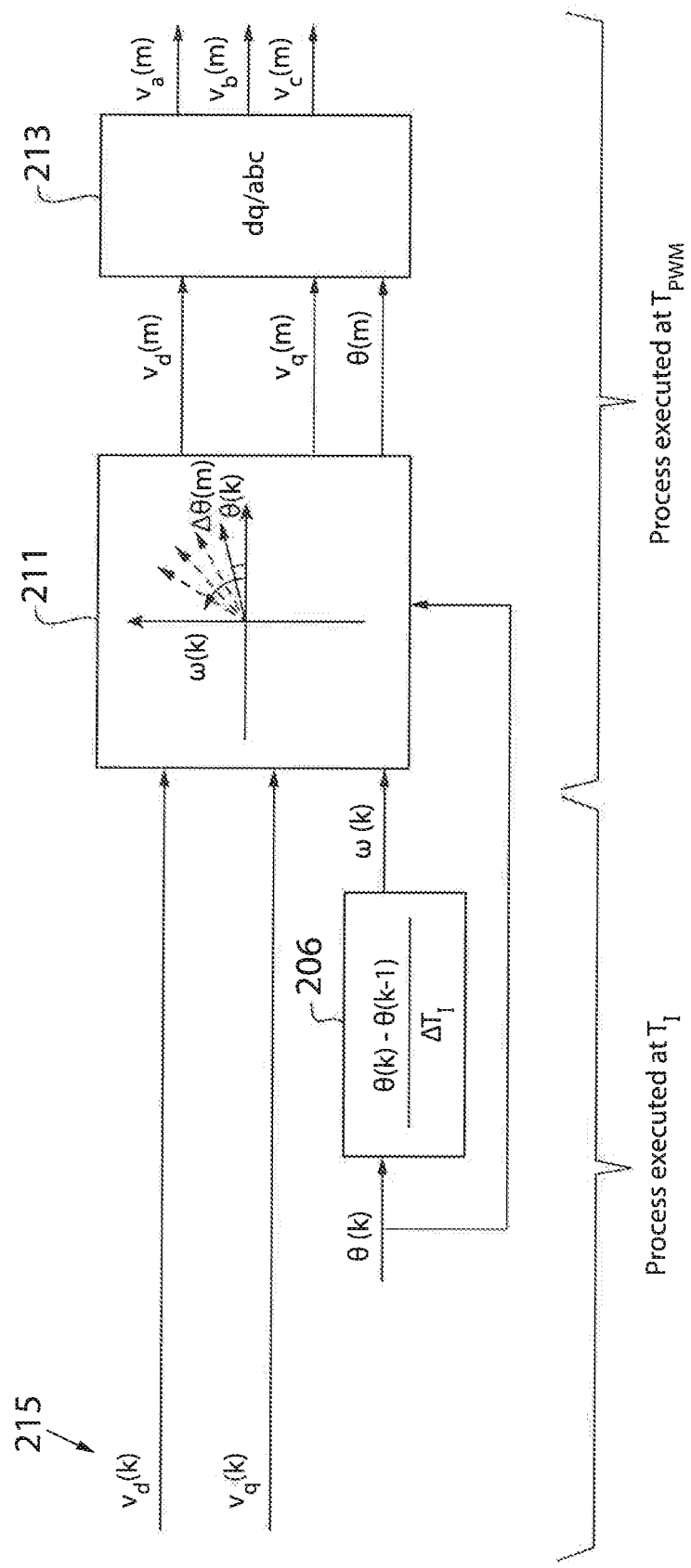
FIG. 8 is a block diagram representation of voltage reference extrapolation according to another embodiment of the invention.

Turning next to FIG. 8, it is contemplated that the output of the current regulator 146, in the d-q synchronous reference frame may be provided as the first reference voltage 215. The electrical angle, θ, obtained as a feedback signal from an encoder coupled to the motor 10 and used in the frame transformer 145 may similarly be provided as the desired electrical angle for the output voltage. A derivative block 206, as discussed above with respect to FIG. 6, is provided to determine the desired angular velocity of the motor. The first voltage reference in the two-phase synchronous reference frame ($v_d$ and $v_q$), the desired electrical angle, θ, and the desired angular velocity, ω, are each provided to the modulation routine and held constant until the next first periodic interval, $T_1$, executes. Optionally, to minimize additional computation during the first periodic interval, $T_1$, just the first voltage reference in the two-phase synchronous reference frame ($v_d$ and $v_q$) and the desired electrical angle, θ, may be provided to the modulation routine. These values are already known as outputs of the current regulator 146 or as measured feedback signals and require no additional computations to occur within the first periodic interval. The derivative block 206 may be executed in the second periodic interval, $T_{PWM}$, to determine the desired angular velocity, ω.

The modulation routine, as illustrated in FIG. 8 therefore, receives at least the first reference voltage and the desired electrical angle for the motor 10 as inputs. The modulation may also receive the desired angular velocity as an input or, optionally, may determine the desired angular velocity. Because the first reference voltage is in the two-phase synchronous reference frame, the desired values of the first reference voltage do not rotate and, therefore, remain constant throughout each of the four second periodic intervals 184 being executed during each of the first periodic intervals 174. The extrapolation block 211, therefore, only needs to determine the difference in electrical angle, Δθ(m), between successive second periodic intervals 184. At each successive period, the electrical angle is incremented by expected difference in electrical angle, Δθ(m), between successive second periodic intervals 184. The reference voltage and the different electrical angles are provided to a transform block 213 where the transform block 213 is configured to execute Park's transform. Park's transform converts a voltage reference between a two-phase synchronous frame and a three-phase stationary frame. The output of the transform block 213 is the three-phase reference voltage corresponding to desired operation of the motor 10.

Figure 9:
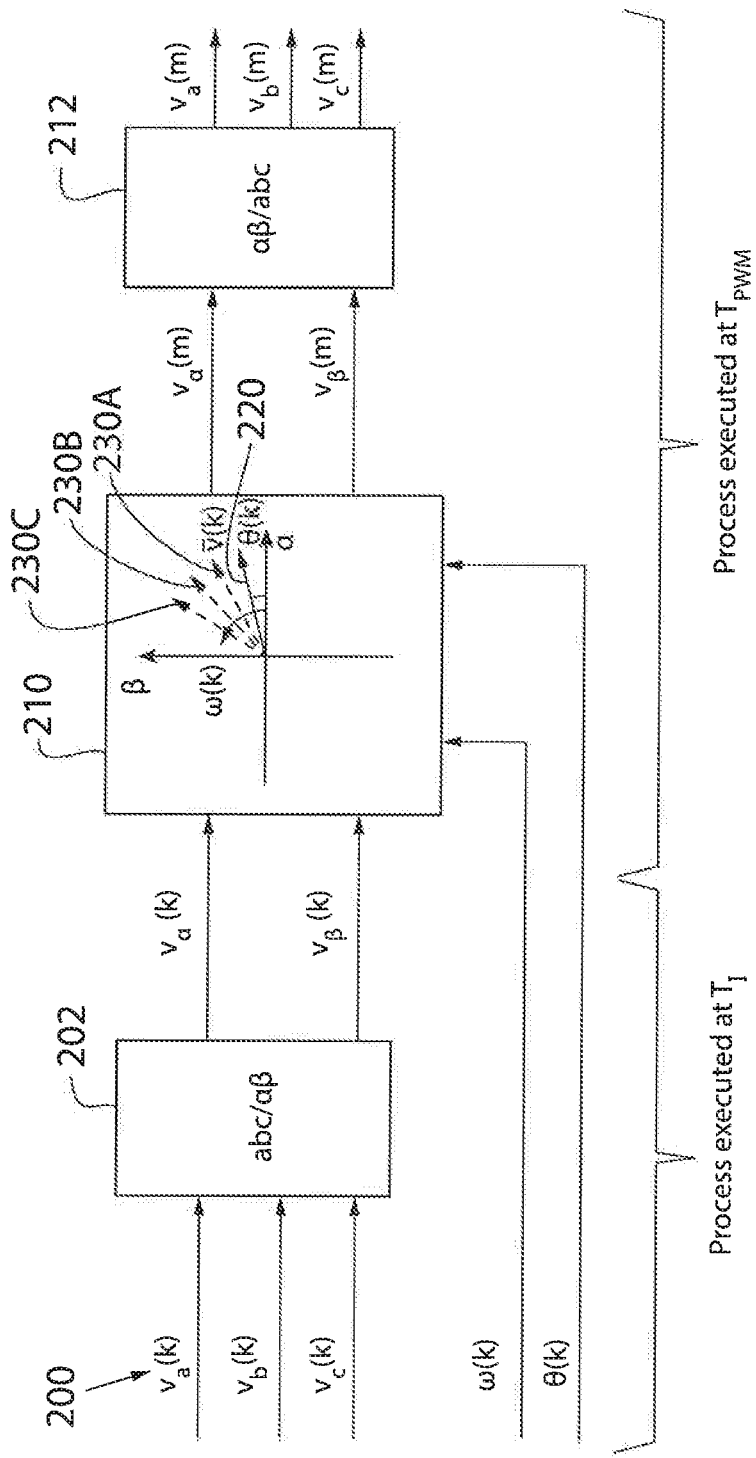
FIG. 9 is a block diagram representation of voltage reference extrapolation according to another embodiment of the invention.

Turning now to FIG. 9, the same first voltage reference signal 200 in the three-phase stationary reference frame as discussed above with respect to FIG. 6 is provided. The three-phase voltage reference signals 200 may be converted to the two-phase stationary reference frame using Clark's transform which may be implemented in block 202. In the embodiment illustrated in FIG. 9, the desired electrical angle and angular velocity are values determined previously during the first periodic interval, $T_1$. As a result, neither the arctangent block 204 nor the derivative block 206 discussed above are required. The three-phase to two-phase transform 202, is again executed in the first periodic interval, $T_1$, with the current regulator. The first voltage reference in the two-phase stationary reference frame ($v_α$ and $v_β$), the desired electrical angle, θ, and the desired angular velocity, ω, are again provided to the modulation routine and held constant until the next of the first periodic intervals, $T_1$, executes. The modulation routine executes at each of the second periodic intervals, $T_{PWM}$, to extrapolate the second set of voltage reference signals in the same manner discussed above with respect to FIG. 6.

As illustrated in FIGS. 6-9, several different embodiments of the invention allow for extrapolation of a second set of voltage references for use by the modulation routine at the second periodic interval, where the second set of voltage references are decoupled from execution of the current regulator in the first periodic interval. The expected electrical angle of the motor at each instance of the second periodic interval is used to extrapolate additional voltage reference signals as a function of the first voltage reference signal output from the current regulator.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An inverter configured to operate at a high switching frequency, the inverter comprising:
    a Direct Current (DC) bus configured to have a DC voltage present on the DC bus;
    an output configured to provide an Alternating Current (AC) voltage to a motor operatively connected to the inverter;
    a plurality of switching devices operatively connected between the DC bus and the output, wherein the plurality of switching devices are selectively controlled to convert the DC voltage to the AC voltage; and
    a processing unit configured to execute a series of instructions to:
        determine a first reference voltage at a first update rate, the first reference voltage corresponding to a desired AC voltage supplied to the motor,
        determine a plurality of second reference voltages at a second update rate, wherein the second update rate is a multiple of the first update rate, wherein each of the plurality of second reference voltages is a function of the first reference voltage and of a desired speed of rotation of the motor.

2. The inverter of claim 1, wherein the processing unit further includes:
    a first processing core configured to determine the first reference voltage at the first update rate; and
    a second processing core configured to determine the plurality of second reference voltages at the second update rate.

3. The inverter of claim 1, wherein the desired speed of rotation of the motor is defined by either an angular velocity reference or an angular position reference.

4. The inverter of claim 1, wherein:
    the first reference voltage is a three-phase voltage in a stationary reference frame,
    an angular position of the first reference voltage is stored in a memory of the inverter during each periodic interval executed at the first update rate, and
    the desired speed of rotation of the motor is determined as a function of the value of the angular position of the first reference voltage stored in the memory at a prior periodic interval and of the angular position of the first reference voltage determined during a current periodic interval at the first update rate.

5. The inverter of claim 1, wherein:
    the first reference voltage is a two-phase voltage in a stationary reference frame,
    an angular position of the first reference voltage is stored in a memory of the inverter during each periodic interval executed at the first update rate, and
    the desired speed of rotation of the motor is determined as a function of the value of the angular position of the first reference voltage stored in the memory at a prior periodic interval and of the angular position of the first reference voltage determined during a current periodic interval at the first update rate.

6. The inverter of claim 1 further comprising an input configured to receive a position feedback signal from a position feedback device operatively connected to the motor, wherein the position feedback signal corresponds to an angular position of the motor.

7. The inverter of claim 6, wherein:
    the first reference voltage is a two-phase voltage in a synchronous reference frame, and
    the desired speed of rotation of the motor is determined as a function of the position feedback signal.

8. The inverter of claim 6, wherein:
    the first reference voltage is a three-phase voltage in a stationary reference frame, and
    the desired speed of rotation of the motor is determined as a function of the position feedback signal.

9. A method for operating an inverter at a high switching frequency, the method comprising the steps of:
    determining a first reference voltage for an Alternating Current (AC) motor operably connected to an output of the inverter, wherein the first reference voltage is determined during a first periodic interval; and
    determining a plurality of second reference voltages for the AC motor, wherein:
        each of the plurality of second reference voltages is determined at a second periodic interval,
        the second periodic interval is shorter than the first periodic interval, and
        each of the plurality of second reference voltages is determined as a function of the first reference voltage and of a desired speed of the motor.

10. The method of claim 9, wherein the desired speed of rotation of the motor is defined by either an angular velocity reference or an angular position reference.

11. The method of claim 9, wherein the first reference voltage is a three-phase voltage in a stationary reference frame, the method further comprising the steps of:
    storing a value of an angular position of the first reference voltage in a memory of the inverter during each periodic interval executed at the first update rate; and
    determining the desired speed of rotation of the motor as a function of the angular position of the first reference voltage stored in the memory at a prior periodic interval and of the angular position of the first reference voltage determined during a current periodic interval at the first update rate.

12. The method of claim 9, wherein the first reference voltage is a two-phase voltage in a stationary reference frame, the method further comprising the steps of:
    storing a value of an angular position of the first reference voltage in a memory of the inverter during each periodic interval executed at the first update rate; and
    determining the desired speed of rotation of the motor as a function of the angular position of the first reference voltage stored in the memory at a prior periodic interval and of the angular position of the first reference voltage determined during a current periodic interval at the first update rate.

13. The method of claim 9 further comprising the step of receiving a position feedback signal at an input of the inverter from a position feedback device operatively connected to the motor, wherein the position feedback signal corresponds to an angular position of the motor.

14. The method of claim 13, wherein the first reference voltage is a two-phase voltage in a synchronous reference frame, the method further comprising the step of determining the desired speed of rotation of the motor as a function of the position feedback signal.

15. The method of claim 13, wherein the first reference voltage is a three-phase voltage in a stationary reference frame, the method further comprising the step of determining the desired speed of rotation of the motor as a function of the position feedback signal.

16. An inverter configured to operate at a high switching frequency, the inverter comprising:
   a Direct Current (DC) bus configured to have a DC voltage present on the DC bus;
   an output configured to provide an Alternating Current (AC) voltage to a motor operatively connected to the inverter;
   a plurality of switching devices operatively connected between the DC bus and the output, wherein the plurality of switching devices are selectively controlled to convert the DC voltage to the AC voltage; and
   a processing unit configured to execute a series of instructions to:
      execute a current regulator at a first update rate, wherein the current regulator generates a first reference voltage, and
      execute a modulation routine at a second update rate, wherein:
         the second update rate is at least twice the first update rate, and
         the modulation routine generates a plurality of second reference voltages as a function of the first reference voltage and of a desired speed of the motor.

17. The inverter of claim 16, wherein:
the current regulator outputs the first reference voltage as a three-phase voltage in a stationary reference frame,
the processing unit is further configured to execute a frame transformation,
the frame transformation provides the first reference voltage to the modulation routine in a two-phase stationary reference frame,
the frame transformation provides an angular position and angular velocity of the first reference voltage to the modulation routine, and
the modulation routine generates the plurality of second reference voltages as a function of the first reference voltage in the two-phase stationary reference frame and of the angular position and angular velocity of the first reference voltage.

18. The inverter of claim 16, wherein:
the current regulator outputs the first reference voltage as a two-phase voltage in a stationary reference frame,
an angular position and angular velocity corresponding to the two-phase voltage are provided to the modulation routine, and
the modulation routine generates the plurality of second reference voltages as a function of the first reference voltage in the two-phase stationary reference frame and of the angular position and angular velocity of the first reference voltage.

19. The inverter of claim 16, wherein:
the current regulator outputs the first reference voltage as a two-phase voltage in a synchronous reference frame,
an angular position and angular velocity corresponding to the two-phase voltage are provided to the modulation routine, and
the modulation routine generates the plurality of second reference voltages as a function of the first reference voltage in the two-phase synchronous reference frame and of the angular position and angular velocity of the first reference voltage.

20. The inverter of claim 16, wherein:
the current regulator outputs the first reference voltage as a three-phase voltage in a stationary reference frame,
the processing unit is further configured to execute a frame transformation,
the frame transformation provides the first reference voltage to the modulation routine in a two-phase reference frame,
the frame transformation provides an angular position and angular velocity of the first reference voltage to the modulation routine, and
the modulation routine generates the plurality of second reference voltages as a function of the first reference voltage in the two-phase reference frame and of the angular position and angular velocity of the first reference voltage.

* * * * *